United States Patent
Aiello et al.

Patent Number: 5,892,829
Date of Patent: Apr. 6, 1999

[54] METHOD AND APPARATUS FOR GENERATING SECURE HASH FUNCTIONS

[75] Inventors: William A. Aiello, Madison, N.J.; Ramarathnam Venkatesan, Redmond, Wash.

[73] Assignee: Bell Communications Research, Inc., Morristown, N.J.

[21] Appl. No.: 4,191

[22] Filed: Jan. 8, 1998

Related U.S. Application Data

[60] Provisional application No. 60/035,222 Jan. 8, 1997.
[51] Int. Cl.⁶ .................................................. H04L 9/00
[52] U.S. Cl. ............................................. 380/25; 380/30
[58] Field of Search ................................ 380/4, 25, 28, 380/30, 46, 49

[56] References Cited

U.S. PATENT DOCUMENTS

| | | | |
|---|---|---|---|
| 4,944,009 | 7/1990 | Micali et al. | 380/46 |
| 5,651,069 | 7/1997 | Rogaway | 380/49 |

*Primary Examiner*—Salvatore Cangialosi
*Attorney, Agent, or Firm*—Joseph Giordano; David A. Hey; Loria B. Yeadon

[57] ABSTRACT

A secure hash function according to the present invention uses a stretch function 202 and a compression function 202 to provide a secure hash value. A stretch function is a function which increases an input string (pre-image). In one version of the invention, a stretch function $f$ maps l-bit inputs into 2m bit, where 2m>l. Preferably, the stretch function $f$ is one-way. The stretch function randomizes the input string. The output of the stretch function is fed into a compression function c, which compresses the stretch function output from 2m bits to 2n bits, where m>n. The compression function is preferably a cryptographic primitive selected from a family of compression functions. In a preferred embodiment, a standard key scheduling algorithm of the cryptographic compression function (such as DES) is replaced and an output of the stretch function is used as the key. The inventors find that using a stretch function output as the compression function key improves the security of the compression function. Moreover, because the stretch function output randomizes the input string, the security constraints on the compression function are less stringent. As a result, an efficient, simple, and secure hash function is provided.

41 Claims, 3 Drawing Sheets

METHOD AND APPARATUS FOR GENERATING SECURE HASH FUNCTIONS

RELATED APPLICATION

This patent application claims the benefit of U.S. Provisional patent application Ser. No. 60/035,222, entitled "New Constructions for Secure Hash Functions" filed on Jan. 8, 1997 for William Aiello and Ramaranthnam Venkatesan. The contents of this provisional application are incorporated herein by reference.

BACKGROUND OF THE INVENTION

1. Field of the Invention

The present invention is directed to a device and method for providing secure, collision resistant hash functions. These secure, collision resistant hash functions are provided by mapping an input string into a longer string using a secure stretch function and then applying a compression function to the longer string.

2. Description of Related Art

A hash function is a function which takes a variable length input string (often called a pre-image) and converts it into a fixed-length output string (often called a hash value). A one way hash function is a hash function which works in one direction. Briefly, a one-way function is a function that is easy to compute but hard to invert on an overwhelming fraction of its range. In a good one-way hash function, given a hash value, it is computationally infeasible to determine the pre-image that hashed to that value. Another type of hash function is a collision resistant hash function. One important feature of a collision resistant hash function is that it is difficult to generate two pre-images which hash to the same hash value.

Hash functions are typically performed by a computer or special purpose processor. FIG. 1 is a block diagram of a computer or processor 100 which may be used to perform hash functions. The device 100 has a processor including one or more CPUs 102, a main memory 104, a disk memory 106, an input/output device 108, and a network interface 110. The devices 102–110 are connected to a bus 120 which transfers data, i.e., instructions and information between each of these devices 102–110. A hash function algorithm may be stored as data in either main memory 104 or a disk memory 106. A pre-image may be provided at the I/O device 108 or network interface 110. The processor 102 may retrieve the algorithm from memory 104 or 106 and receive the pre-image from the I/O (or network interface 110), both via the bus 120. The processor 102 may perform the hash and provide the hash value to the I/O device 108 (or network interface 110) or store the hash value in memory 104, 106.

Hash functions play a crucial role in practical cryptography and are in ubiquitous use. Applications for hash functions include authentication, digital signatures, and digital time stamping. As a result, the security of a hash function is important. Widely used constructions like the well known SHA (Secure Hash Algorithm), MD4 (Message Digest 4), and MD5 (Message Digest 5) hash functions have been recently attacked, raising questions about their security. MD5, for example, has been widely used, somewhat studied, and is quite efficient. But MD5 has come under attack by cryptanalysts. For example, den Boer and Bosselaers have produced collisions using MD5's compression function. (B. den Boer and A. Bosselaers, "Collisions for the Compression Function of MD5," *Advances in Cryptology—EUROCRYPT '93 Proceedings,* Spring-Verlag, 1994, pp. 293–304). On the other hand, constructions based on block ciphers like DES, while they have been less successfully attacked (and thus more secure), are usually slow, and need a large number of encryptions per block of data compressed. As a result, block ciphers are less efficient; that is they are computationally intensive and therefore use a great deal of processing power and time.

Therefore, it is an object of the present invention to provide a secure hash function which is simple in design and which yields a faster hash primitive.

SUMMARY OF THE INVENTION

These and other objects of the present invention are achieved by a secure hash function according to the present invention. The present invention uses a stretch function and a compression function to provide a secure hash value.

As used herein, a stretch function is a function which increases an input string (pre-image) of information elements, such as bits. In a preferred embodiment, a stretch function $f$ maps 1-bit inputs into 2m bits, where 2m>l. Preferably, the stretch function $f$ is one-way. Preferably, the stretch function randomizes the input string, and is one-to-one along almost all points in the range of the function. The output of the stretch function is fed into a compression function c, which compresses the stretch function output from 2m bits to 2n bits, where m>n and which may have an initial value IV of S bits. The compression function is preferably a cryptographic compression function such as MD4, MD5, SHA-1, or suitably modified block cypher such as DES (see R. C. Merkle. *Advances in Cryptoloty—Crypto '89,* Lecture Notes in Computer Science, Vol. 435 Springer-Verlag, 1988). In an embodiment using a suitably modified block cypher, preferably, the output of the stretch function is used for an extended key of the cipher in place of the extended key produced by the standard key scheduling algorithm of the cipher. The inventors find that using a stretch function output as the compression function key improves the security of the compression function. Moreover, because the stretch function output randomizes the input string, the security constraints on the compression function are less stringent.

As a result, an efficient, simple, and secure hash function is provided.

BRIEF DESCRIPTION OF THE DRAWINGS

These and other features of the present invention will be made apparent with reference to the following drawings.

DETAILED DESCRIPTION OF PREFERRED EMBODIMENTS

For clarity of presentation, the invention is described in the following sections:

I. Overview

Figure 2:
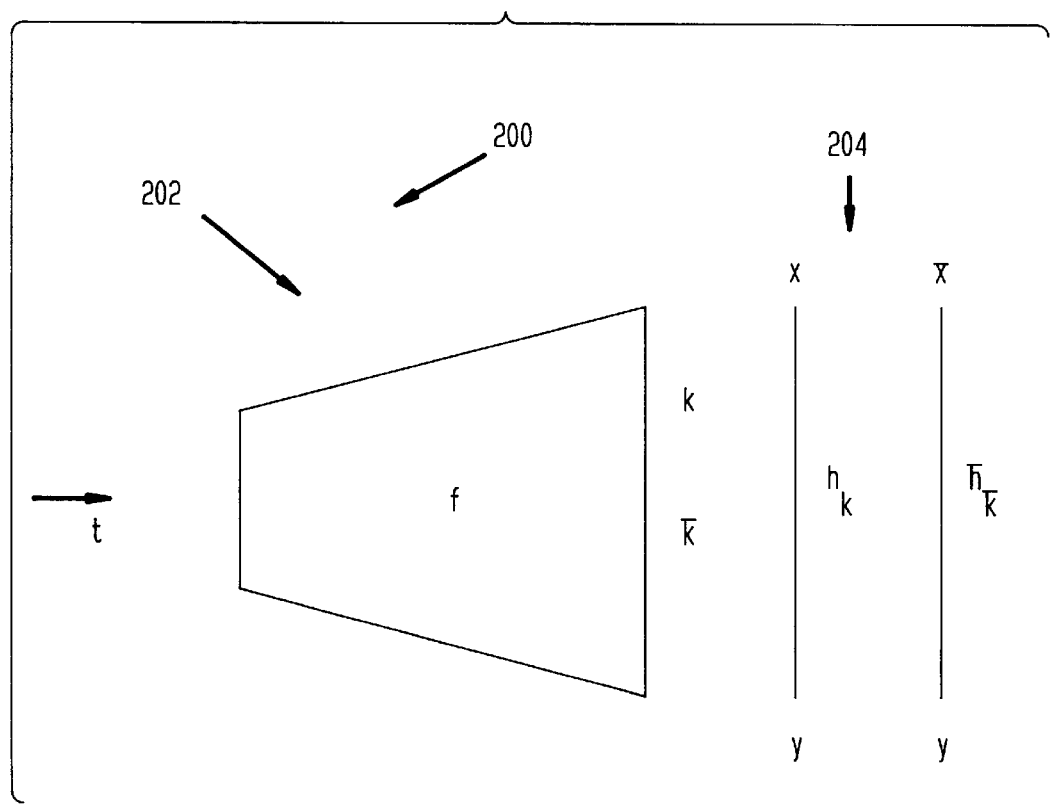
FIG. 2 illustrates a method of performing a secure hash according to a preferred embodiment of the present invention.
Figure 3:
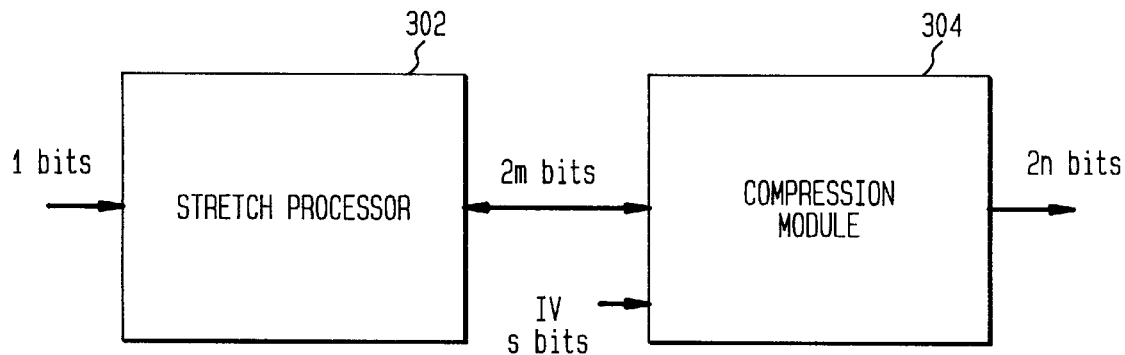
FIG. 3 is a block diagram of a hashing device according to a preferred embodiment of the present invention.

An overview of the operation and structure of the present invention is provided with reference to FIGS. 2 and 3.

II. The Stretch Function and Stretch Processor

The stretch function and the stretch processor are described with reference to FIGS. 3 and 4.

III. The Compression Function and the Compression Module

The compression function and the compression module are described with reference to FIGS. 3 and 5.

VI. Conclusion

A conclusion is provided.

I Overview

FIG. 2 illustrates the operation of the invention. In a preferred embodiment, a stretch function $f$ (202) maps l bit inputs from input string t into 2m bit outputs, where 2m>l. In a preferred embodiment, a stretch function is a function which mildly increases an input string. Preferably, the stretch function $f$ is (1) one-way: given any $y=f(x)$, it is hard to find any x' such that $f(x')=y$, (2) randomizing, and (3) one-to-one on almost all points in the range of outputs.

The output of the stretch function 202 is fed into a compression function c (204), which compresses the stretch function output from 2m bits to 2n bits. The compression function c is preferably a cryptographic compression function. As seen in FIG. 2, the compression function 204 may comprise a plurality of primitives, such as the two primitives h, $\bar{h}$, from s+m bits to n bits. s bits of the input of h may be randomly chosen and fixed. Call this value x. It is the initial value of h. One can write $h(x,K)=g_x(K)$ where g is randomly chosen from a family of $2^s$ functions, indexed by a key x. n bits of the input $\bar{h}$ of are randomly chosen and fixed. Call this value $\bar{x}$. One can write $\bar{h}(\bar{x},K)=\bar{g}_{\bar{x}}(K)$ where $\bar{g}$ is randomly chosen from a family of $2^s$ functions, indexed by a key $\bar{x}$. H is the initial value of h. Thus, the compression function c (204) may be defined as:

$$c(K,\bar{K},x,\bar{x})=h(K,x), \bar{h}(\bar{K},\bar{x})$$

Where X and $\bar{X}$ constitute the initial value IV for c. In a preferred embodiment in which h and/or h are a suitably modified block cipher, the output of the stretch function K, $\bar{K}$ may be used as the extended key of the cipher in place of the extended key produced by the standard key scheduling algorithm of the cipher. The inventors find that using a stretch function output as the compression function key improves the security of the compression function.

The overall inventive hash function H may be defined as:

$$H(t)=c(f(t),x,\bar{x})$$

(where t is the input string and x, x are the initial value IV of H).

Figure 1:
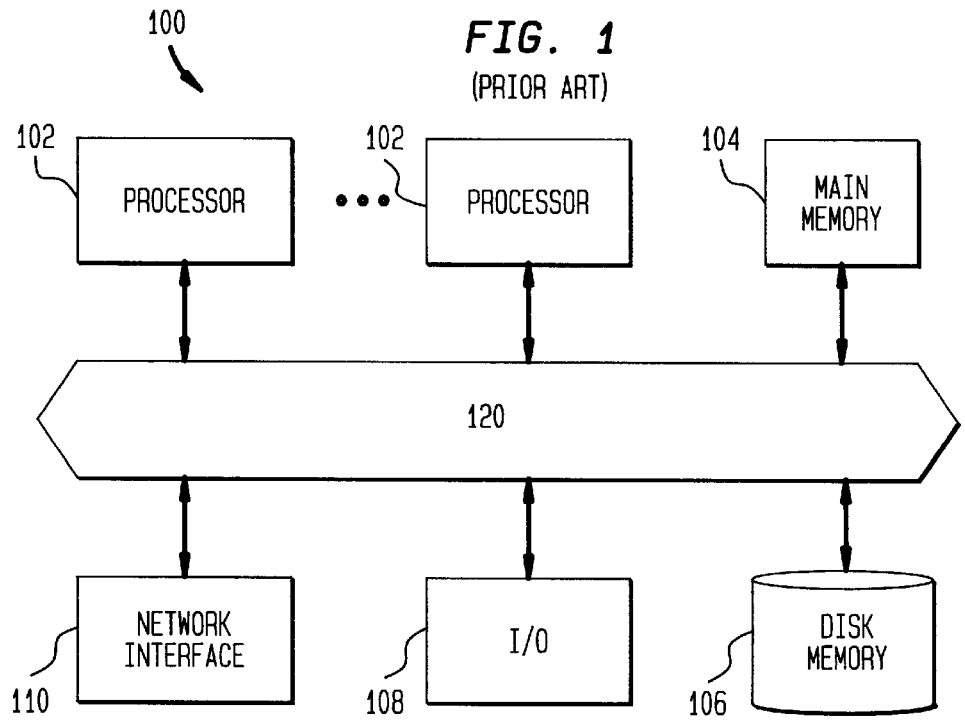
FIG. 1 is a block diagram illustrating a conventional computer or special purpose processor.

FIG. 3 is a block diagram of a secure hashing device 300 according to the present invention. The device 300 may include a stretch processor 302 and a compression module 304. The stretch processor 302 and compression module 304 may be located in a computer or special purpose processor 100 as seen in FIG. 1. For example, the stretch processor 302 and compression module 304 may be a combination of algorithms stored in memory 104, 106 and processed by the processor 102. Alternatively, an application specific integrated circuit (ASIC) may be developed which contains a processor and the algorithms.

The stretch processor 302 may receive an input string t having l bits from an I/O 108 or network interface 110. The stretch processor 302 performs a stretch function 202 on the l bits of t and outputs a longer string having 2m bits, where 2m>l. Preferably, 2m is selected to be sufficiently larger than l so that the outputs of the stretch processor 302 are one-to-one on almost all elements in the range of outputs. The 2m bits are then sent to the compression module 304. The compression module performs a compression function 204 on the 2m bits and outputs 2n bits, where l>2n. The compression module 304 may also receive an initial value IV, which may be s bits long.

In a preferred embodiment, 2m–l may be on the order of a 10% increase over l or higher and preferably in a range between 30%–60% higher. As an example, suitable values for the variables discussed above are:

l=1024, m=16*48=768; and

2n=128.

A person skilled in the art readily recognizes that preferred values of l, m, and n vary according to the specific application of the invention.

Given a fixed-length collision-resistant hash function H mapping l bit inputs to N bit outputs (N<l), one can build a collision-resistant hash function g defined on arbitrary-length inputs following the construction of Merkle (R. C. Merkle, "A fast software one-way hash function", *Journal of Cryptology*, Vol. 3, pp. 43–58 (1990)) and Damgard (I. Damgard, "A design principle for hash functions", *Advances in Cryptology—Crypto '89, Lecture Notes in Computer Science*, Vol. 435, pp. 416–427, Springer-Verlag (1988)). As seen in FIG. 3, assign a fixed bit string, IV, and let the value of g(x) on an input $x=x_1, x_2, \ldots, x_t$ (formatted with "Merkle-Damgard strengthening," i.e., with appropriate padding to encode the length of the text, as t blocks of length l–N) be defined as follows: $g_o=IV$; $g_i=g(G_{i-1}, x_i)$, $1 \leq i \leq t$; $G(x)=G_t$.

II The Stretch Function and Stretch Processor

The stretch processor 302 receives an input string and performs a stretch function 202 which randomizes the input string. In a preferred embodiment, the stretch function uses existing "secure" hash primitives like hash functions SHA, MD4, and MD5, and block cipher DES or other suitable hash functions or block ciphers. As discussed above, some of these primitives have been attacked and as a result, their security may be compromised. The present invention, however, relies only on the one-wayness and randomness properties of the chosen functions.

Figure 4:
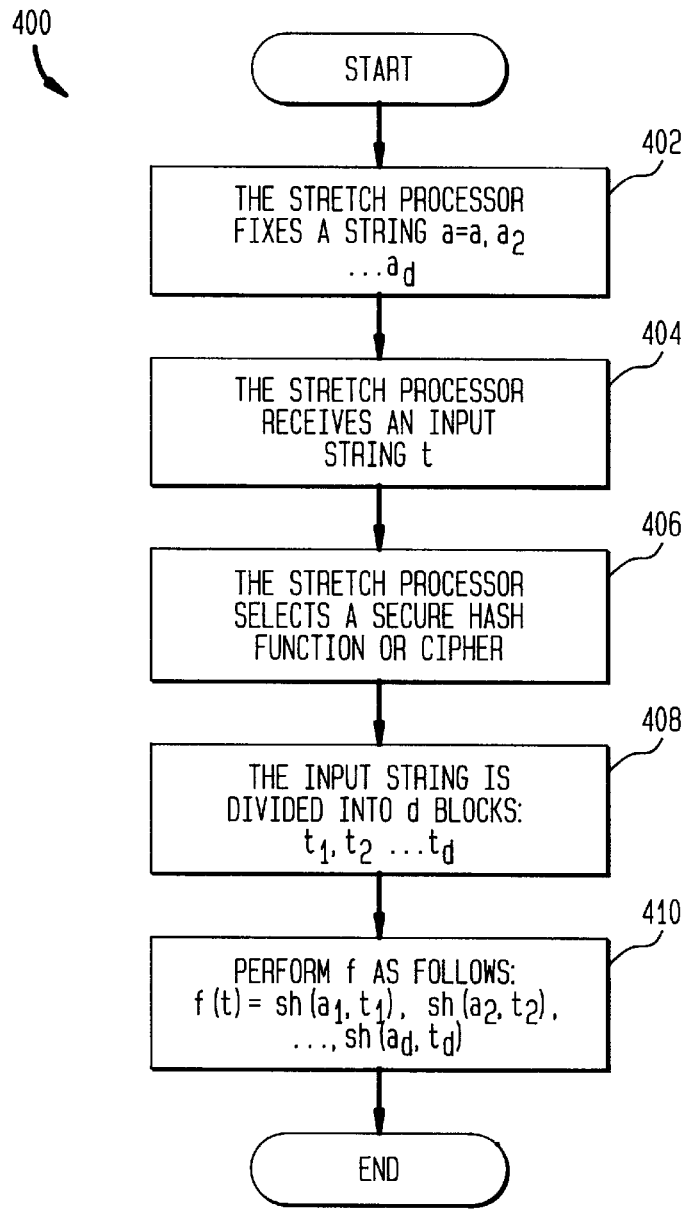
FIG. 4 is a flowchart of a preferred method of performing a stretch function according to the present invention.

FIG. 4 is a flowchart 400 illustrating a preferred method of performing the stretch function 202. As seen in FIG. 4, the method is implemented as follows:

1. The stretch processor 302 fixes a string $\alpha=\alpha_1, \ldots, \alpha_d$ (step 402).
2. The stretch processor 302 receives an input string (step 404) and stretches the input string t using an algorithm stored, for example, in a memory 104, 106 as follows:
   a. The stretch processor 302 selects a secure hash function or cipher sh, such as one of the functions listed above (different functions may be used in different invocations of sh(.)) (step 406).
   b. Break the input t into d blocks $t_1, \ldots, t_d$ (step 408).
   c. Perform $f$ as follows (step 410):

$$f(t)=h(\alpha_1, t_1), sh(\alpha_2, t_2), \ldots, sh(\alpha_d, t_d)$$

In a second preferred embodiment, a chaining variation may be used as the stretch function $f$. In the above function, using an algorithm stored, for example, in memory 104, 106, the stretch processor 302 selects some $\alpha_1$ of length $\lambda$, where $\lambda$ is a fixed value. Then, function $f$ performed by the processor may be modified by chaining the values for $\alpha_i$, for i=2, . . . , d in the following manner:

$$\alpha_2 = MSB\lambda(sh(\alpha_2, t_1)), \alpha_3 = MSB\lambda(sh(\alpha_2, t_2)), \ldots$$
$$\alpha_i = MSB\lambda(sh(\alpha_{i-1}, t_{i-1})), \ldots, \alpha_d = MSB\lambda(sh(\alpha_{d-1}, t_{d-1}))$$

Here MSB$\lambda$ stands for the $\lambda$ most significant bits of the argument.

Choosing 2m−1 to be large enough (as discussed above) and if the stretching function is sufficiently random, $f$ is one-to-one on almost all points in the range of outputs.

The stretching function described above thoroughly randomizes the input string. This prevents any targeted selection of input pairs for the compression function c, in an arguable way. In this respect, the stretch function is secure. The inability to target the outputs to a set of the attacker's choice pays off: in fact, it considerably simplifies the construction of the compression function.

III The Compression Function and the Compression Module

The compression module 304 receives the 2m bits output by the stretch processor 302 and compresses these bits into 2n bits using compression function 204. The compression function c performed by the compression module 304 is preferably a cryptographic compression function, such as MD4, MD5, SHA or, as described below, DES. As seen in FIG. 2, the compression function 204 may comprise a plurality of primitives, such as primitives h, h, from s+m bits to n bits where s bits constitute an initial value, IV. Of course, three or more primitives may be used, i.e., h, h', h", etc. Using two primitives, the compression function c (204) may be defined as:

$$c(K, \bar{K}, x, \bar{x}) = h(K, x), \bar{h}(\bar{K}, \bar{x})$$

where x and $\bar{x}$ are the initial values of h and $\bar{h}$ respectively. As described below, the inventors find that using a stretch function output as the compression function key improves the security of the compression function. This is described in more detail below.

Figure 5:
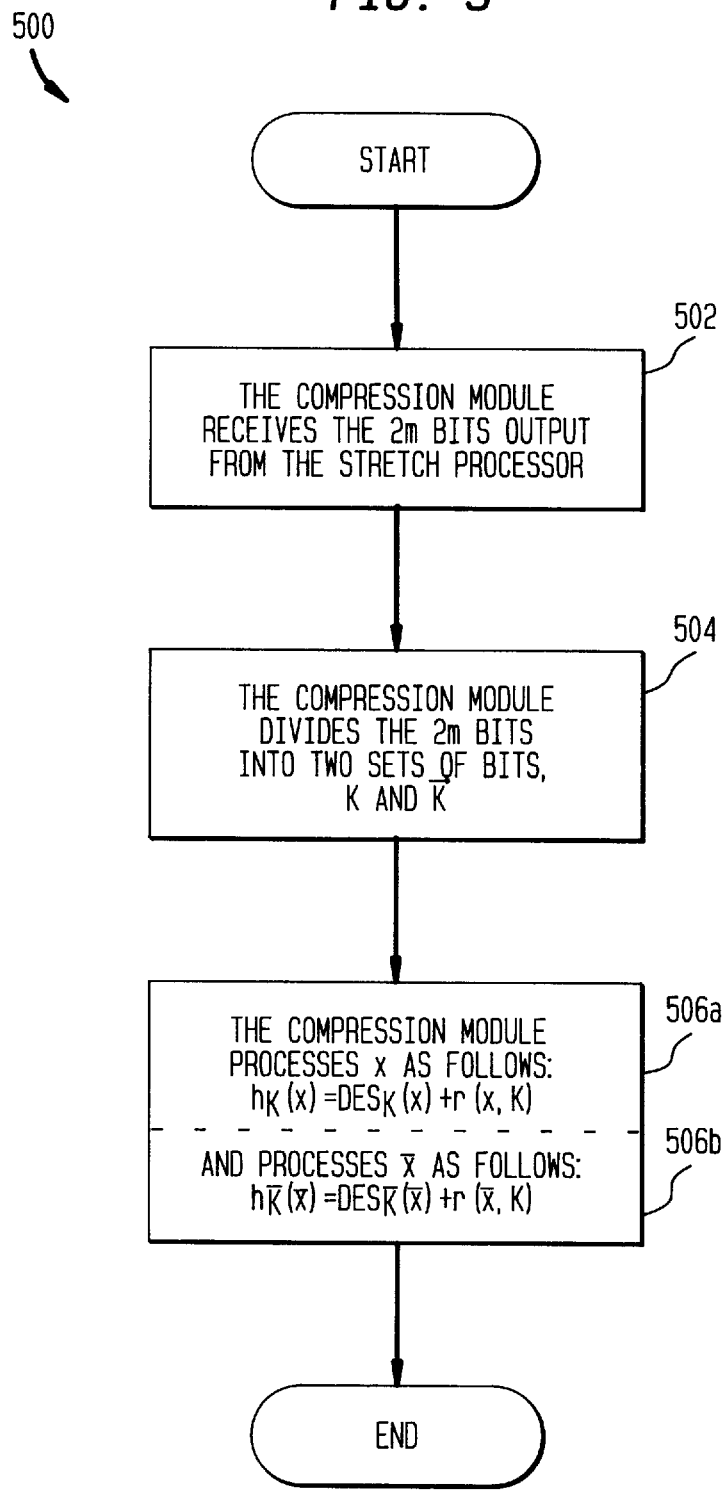
FIG. 5 is a flowchart illustrating a preferred method of performing a compression function according to the present invention.

FIG. 5 is a flowchart 500 illustrating a preferred method of performing the compression function c 204. As seen in FIG. 5, the method is implemented as follows:

1. The compression module receives the 2m bits output by the stretch processor 302 (step 502).
2. The compression module 304 divides the 2m output bits into two sets of bits, K and $\bar{K}$ (step 504).
3. The compression module 302, using an algorithm stored, for example, in a memory 104, 106, processes x and K as follows (step 506a):

$$h_K(X) = DES_k(X) + r(x, K)$$

4. The compression module 302, using an algorithm stored, for example, in a memory 104, 106, processes $\bar{x}$ and $\bar{K}$ as follows (step 506b):

$$\bar{h}_{\bar{K}}(x) = DES_{\bar{K}}(\bar{x}) + r(\bar{x}, \bar{K})$$

Here the "+" sign indicates any simple arithmetic or field operation, such as addition, subtraction, bit-wise exclusive-or, etc. Also, r(x,K) (and r($\bar{x}, \bar{K}$)) is preferably a fixed, easy to compute function. The function r(x,K) may be r(x,K)=x. In a preferred embodiment, r(x, K) is a hash function. Preferred hash functions include r(x,K)=ax+b mod $2^n$ and r(x,K)=aK+b mod $2^n$, where the pair (a,b) is randomly chosen with a odd.

K and $\bar{K}$ may be standard DES keys by choosing m=56. That is, the 56 bits are supplied to the standard DES key scheduling algorithm. In a preferred embodiment, however, the stretch function output may be used by the compression module 304 as the key scheduling algorithm in place of the standard DES keys. This may be done in the following manner:

1. Let EK DES denote DES without the key scheduling algorithm performed by the compression module 304 and which expects an expanded key of length m (e.g., 16*48) to be supplied directly from the stretch processor 302.
2. Denote the encryption of x with an expanded key K as y=EK$_{DES}$(x).
3. h(x,K) may now be defined as:

$$h(K,x)_i = EK \; DES_K(x) + r(x, K).$$

Evidence supports that this is a secure use of the function. Replacing the standard key scheduling algorithm has two advantages. First, this speeds up the overall hash process because the DES key scheduling algorithm is slow. Second, previously, block ciphers have not been efficient enough for compression because of the number of input bits which may be accepted by DES. For example, using a conventional DES key scheduling algorithm, only 56 bits may be input into the DES cipher. Here, however, because the key scheduling algorithm has been replaced with the output of the stretch processor 302, a greater number of bits may be accepted by the DES block cipher than previously permitted. For example, if the stretch processor 302 receives a 100 bit input string and increases that string by 50%, a 150 bits are output. These 150 bits are used as K, $\bar{K}$. As a result, DES, which was previously thought to be too inefficient for use as a hash function, may now be used as a suitable compression function when used in accordance with the present invention.

Alternatively, the compression function c may be performed wherein each primitive operates on all of the outputs. This may be defined as:

$$c(K, \bar{K}, x, \bar{x}) = h(K, \bar{K}, x, \bar{x}) + r(K, \bar{K}, x, \bar{x}), \bar{h}(K, \bar{K}, x, \bar{x}) + r(K, \bar{K}, x, \bar{x}).$$

Another alternative may be where the simple function "r" operates on all of the outputs. This may be defined as follows:

$$c(K, \bar{K}, x, \bar{x}) = h(K, x) + r(K\bar{K}, x, \bar{x}), \bar{h}(\bar{K}, \bar{x}) + r(K\bar{K}, x, \bar{x}).$$

where r is a simple, potentially randomly chosen and fixed hash function similar to those already mentioned. Again, the "+" sign may represent any simple arithmetic or field operation.

For example:

h(K,x)=EK−DES(K,x),
h($\bar{K}, \bar{x}$)=EK−DES($\bar{K}, \bar{x}$)
r(K,$\bar{K}$,x,$\bar{x}$)=$\bar{x}$ $\bar{r}(K,\bar{K},x,\bar{x})=\bar{x}$.

Performing the compression function in this manner helps to thwart an adversary attempting to find a collision.

Also, as defined above, the compression function may be adapted to receive an input string of arbitrary length. Given a fixed-length collision-resistant hash function H mapping l bit inputs to N bit outputs (N<l), one can build a collision-resistant hash function g defined on arbitrary-length inputs following the construction of Merkle (R. C. Merkle, "A fast software one-way hash function", *Journal of Cryptology*, Vol. 3, pp. 43–58 (1990)) and Damgard (I. Damgard, "A design principle for hash functions", *Advances in Cryptology—Crypto '89, Lecture Notes in Computer Science*, Vol. 435, pp. 416–427, Springer-Verlag (1988)). As seen in FIG. 3, assign a fixed bit string IV, and let the value of g(x) on an input x=$x_1$, $x_2$, . . . $x_t$ (formatted with "Merkle-Damgard strengthening," i.e., with appropriate padding to encode the length of the text, as t blocks of length l–N) be defined as follows: $g_o$=IV; $g_i$=g($G_{i-1}$, $x_i$), $1 \leq i \leq t$; G(x)=$G_t$.

In the hash function, the keys are known to an attacker. This allows the attacker to mount a well known meet-in-the-middle attack, which may be performed on algorithms using double encryption. Here, however, the meet-in-the-middle attack is thwarted for two reasons: First, to be able to mount a meet-in-the-middle attack on the keys, the attacker must be able to choose at least some portion of the keys. It is easy to check that the one-wayness and the randomizing properties of the stretch function prevent the attacker from doing so. Second, the present invention uses DES in a non-invertible way. DES is used as a one-way function mapping (K, x) y. That is, given any y it is considered infeasible to find a key K and input x to DES that generate this output so that y=$DES_K(x)$+(x,K).

IV Conclusion

Disclosed is a device and method for providing secure, collision resistant hash functions. The inventors find that the inventive method and device provide a simpler primitive to design and analyze and which yields a faster secure hash function than the prior art. These secure, collision resistant hash functions are provided by mapping an input string into a longer string using a secure stretch function and then applying a compression function to the longer string.

The above described embodiments of the invention are intended to be illustrative only. Numerous alternative embodiments may be devised by those skilled in the art without departing from the spirit and scope of the following claims.

We claim:

1. A method for performing a hash function on a string of information elements, comprising the steps of:
   a. a stretch processor receiving an input string of information elements;
   b. the stretch processor stretching the input string into a longer string;
   c. a compression module receiving the longer string; and
   d. the compression module compressing the longer string into a hash value.

2. The method of claim 1, wherein the step of stretching an input string further comprises:
   a. the stretch processor dividing the input string into d blocks; and
   b. the stretch processor performing a one way hash function on each of the d blocks.

3. The method of claim 2, wherein the step of the stretch processor performing a one way hash function on each of the blocks is defined as:

$$J(t)=sh(\alpha_1,t_1), sh(\alpha_2,t_2), \ldots, sh(\alpha_d,t_d)$$

where:

f(t) is a stretching function performed on the input string;

sh is a one way hash function;

$\alpha_1$, $\alpha_2$, . . . , $\alpha_3$ are portions of a second string of information elements; and $t_1$, $t_2$, . . . , $t_d$ are divided portions of the input string.

4. The method of claim 3, wherein the step of the stretch processor performing a one way hash function on each of the blocks further comprises the stretch processor selecting a plurality of hash functions sh, each one of the plurality of hash functions being performed on a particular one of the blocks.

5. The method of claim 3, further comprising the step of selecting $\alpha_1$ as a string having a length $\lambda$ and $\alpha_n$ for i=2, . . . , d are $\alpha_i$=MSB$\lambda$ (sh ($\alpha_{i-1}$, $t_{i-1}$)) where MSB$\lambda$ is $\lambda$ most significant elements of the argument.

6. The method of claim 1, wherein the step of stretching further comprises randomizing the input string.

7. The method of claim 1, wherein the step of performing a compression function further comprises performing a cryptographic compression function.

8. The method of claim 7, wherein the step of performing a cryptographic compression function further comprises performing a plurality of primitives.

9. The method of claim 7, wherein the step of performing a cryptographic compression function further comprises performing two compression function primitives h,$\bar{h}$, from s+m bits to n bits, where s, m and n are integers.

10. The method of claim 9, wherein:

h(x,K)=$g_x$(K) and $\bar{h}(\bar{K},\bar{x})=\bar{g}_{\bar{x}}(\bar{K})$;

where x and $\bar{x}$ are an initial value;

g is randomly chosen from a family of $2^s$ functions indexed by a key x;

$\bar{g}$ is randomly chosen from a family of $2^s$ functions indexed by a key $\bar{x}$; and K, $\bar{K}$ are keys to the cryptographic compression function.

11. The method of claim 9, wherein the step of performing the cryptographic compression function further comprises the compression module using an output of the stretch processor as a key for the primitives.

12. The method of claim 1, wherein the step of performing a compression function further comprises the compression module:
   a. receiving 2m information elements from the stretch processor;
   b. dividing the 2m bits into two sets of bits; and
   c. processing the two sets of bits using a compression function and a fixed function.

13. The method of claim 12, wherein the compression function is DES.

14. The method of claim 12, wherein the fixed function is a hash function.

15. The method of claim 8, wherein the step of performing a plurality of primitives further comprises performing each of the primitives on all of the outputs of the stretch processor.

16. The method of claim 1, further comprising adapting the compression function to operate on a variable length input string.

17. A hashing device, comprising:
a. a stretch processor configured to receive an input string of information elements and to stretch the input string into a longer string; and
b. a compression module configured to receive the longer string, to perform a compression function on the longer string, and to output a hash value.

18. The hashing device of claim 17, wherein the stretch processor is configured to randomize the input string.

19. The hashing device of claim 17, wherein the longer string is one-to-one on substantially all elements in a range of outputs.

20. The hashing device of claim 17, wherein stretch processor is further configured to:
a. divide the input string into d blocks; and
b. perform a one way hash function on each of the d blocks.

21. The hashing device of claim 20, wherein the stretch processor is further configured to perform the one way hash function on each of the blocks as follows:

$$f(t)=sh(\alpha_1,t_1), sh(\alpha_2,t_2), \ldots, sh(\alpha_d, t_d)$$

where:
f(t) is a stretching function performed on the input string;
sh is a one way hash function;
$\alpha_1, \alpha_2, \ldots, \alpha_3$ are portions of a string of information elements; and
$t_1, t_2, \ldots, t_d$ are divided portions of the input string.

22. The hashing device of claim 21, wherein the stretch processor is further configured to select a plurality of hash functions sh, each one of the plurality of hash functions being performed on a particular one of the blocks.

23. The hashing device of claim 21, wherein the stretch processor is further configured to select $\alpha_1$ as a string having a length $\lambda$ and $\alpha_i$ for i=2, . . . , d are $\alpha_i$=MSB$\lambda$ (sh ($\alpha_{i-1}$, $t_{i-1}$)) where MSB$\lambda$ is $\lambda$ most significant elements of the argument.

24. The hashing device of claim 17, wherein the compression module is further configured to perform a cryptographic compression function.

25. The hashing device of claim 24, wherein the compression module is further configured to perform a plurality of primitives.

26. The hashing device of claim 24, wherein the compression module is further configured to perform two compression function primitives h,$\bar{h}$, from s+m bits to n bits, where s, m and n are integers.

27. The hashing device of claim 26, wherein the compression module is further configured to perform the two primitives as follows:

h(x,K)=$g_x$(K) and
$\bar{h}(\bar{K},\bar{x})$=$\bar{g}_{\bar{x}}(\bar{K})$;

where x and $\bar{x}$ are an initial value;
g is randomly chosen from a family of $2^s$ functions indexed by a key x;
$\bar{g}$ is randomly chosen from a family of $2^s$ functions indexed by a key $\bar{x}$; and
K, $\bar{K}$ are keys to the cryptographic compression function.

28. The hashing device of claim 25, wherein the compression function is a modified block cipher and the compression module is configured to use an output of the stretch processor as a key for the primitives.

29. The hashing device of claim 17, wherein the compression module is further configured to:
a. receive 2m information elements from the stretch processor;
b. divide the 2m bits into two sets of bits; and
c. process the two sets of bits using a compression function and a fixed function.

30. The hashing device of claim 29, wherein the compression function is DES.

31. The hashing device of claim 30, wherein the fixed function is a hash function.

32. The hashing device of claim 25, wherein the compression module is configured to perform each of the primitives on all outputs of the stretch processor.

33. The hashing device of claim 17, wherein the compression module is further configured to perform the compression function on a variable length input string.

34. The method of claim 1, wherein the hash value is collision resistant.

35. The method of claim 1, wherein the step of stretching the input string further comprises stretching the input string at least by 10%.

36. The method of claim 35, wherein the step of stretching the input string further comprises stretching the input string between 30% and 60%.

37. The method of claim 12, wherein the step of processing the two sets of bits using a fixed function further comprises performing a single fixed function on the two sets of bits.

38. The hashing device of claim 17, wherein the hash value is collision resistant.

39. The hashing device of claim 17, wherein the stretch processor is configured to stretch the input string at least 10%.

40. The hashing device of claim 39, wherein the stretch processor is configured to stretch the input string between 30% and 60%.

41. The hashing device of claim 29, wherein the fixed function is a single fixed function and the compression module is configured to perform the single fixed function on the two sets of bits.

* * * * *

UNITED STATES PATENT AND TRADEMARK OFFICE
CERTIFICATE OF CORRECTION

PATENT NO. : 5,892,829
DATED : April 6, 1999
INVENTOR(S) : William A. Aiello and Ramarathnam Venkatesan It is certified that error appears in the above-identified patent and that said Letters Patent are hereby corrected as shown below:

Column 8, line 5, change "J(t)" to "f(t)"

Signed and Sealed this

Eighth Day of May, 2001

*Attest:*

NICHOLAS P. GODICI

*Attesting Officer*  Acting Director of the United States Patent and Trademark Office